(12) United States Patent
Greenfield

(10) Patent No.: US 7,225,756 B2
(45) Date of Patent: Jun. 5, 2007

(54) PET BEDS

(75) Inventor: Malcolm Richard Greenfield, Knottingly (GB)

(73) Assignee: Eurostitch Limited (GB)

( * ) Notice: Subject to any disclaimer, the term of this patent is extended or adjusted under 35 U.S.C. 154(b) by 0 days.

(21) Appl. No.: 10/954,812

(22) Filed: Sep. 30, 2004

(65) Prior Publication Data

US 2006/0112888 A1 Jun. 1, 2006

Related U.S. Application Data

(63) Continuation-in-part of application No. 10/106,394, filed on Mar. 26, 2002, now abandoned.

(30) Foreign Application Priority Data

Mar. 30, 2001 (GB) .................................. 0107980.5

(51) Int. Cl.
*A01K 1/015* (2006.01)
*A47G 9/00* (2006.01)

(52) U.S. Cl. ............................ 119/28.5; 119/526; 5/420; 5/419; 30/118; 30/119

(58) Field of Classification Search .............. 119/28.5, 119/526; D30/118, 119, 120; 5/420, 419, 5/93.1, 98.1, 652, 655.9, 657, 657.5, 663
See application file for complete search history.

(56) References Cited

U.S. PATENT DOCUMENTS

| | | | | |
|---|---|---|---|---|
| 3,266,832 A | * | 8/1966 | Johnston | 292/228 |
| 3,694,831 A | * | 10/1972 | Treace | 5/638 |
| 3,833,947 A | * | 9/1974 | Sorensen | 5/94 |
| 4,107,799 A | * | 8/1978 | Lambert | 5/680 |
| D268,957 S | * | 5/1983 | Bunger | D30/120 |
| 4,571,762 A | * | 2/1986 | Rhoton et al. | 5/680 |
| 4,672,698 A | * | 6/1987 | Sands | 5/424 |
| 4,799,277 A | * | 1/1989 | Goodale | 5/680 |
| 4,860,689 A | * | 8/1989 | Stewart | 119/28.5 |
| 4,912,789 A | * | 4/1990 | Maxwell | 5/680 |
| 5,029,350 A | * | 7/1991 | Edelson | 5/652 |
| 5,033,408 A | * | 7/1991 | Langenbahn | 119/28.5 |
| 5,079,790 A | * | 1/1992 | Pouch | 5/630 |
| 5,265,558 A | * | 11/1993 | Schonrock | 119/28.5 |
| 5,311,837 A | * | 5/1994 | Mamer-Boellstorff | 119/28.5 |
| D351,687 S | * | 10/1994 | McMahon | D30/118 |
| D355,999 S | * | 3/1995 | Townsend | D6/502 |
| 5,685,258 A | * | 11/1997 | Fricano | 119/28.5 |
| D391,687 S | * | 3/1998 | McMahon | D30/118 |

(Continued)

FOREIGN PATENT DOCUMENTS

GB 2323013 A 9/1998

*Primary Examiner*—Yvonne R. Abbott
(74) *Attorney, Agent, or Firm*—Trexler, Bushnell, Giangiorgi, Blackstone & Marr, Ltd.

(57) ABSTRACT

The invention relates to pet beds, and particularly with pet beds with a wall and a base encased in a fabric overcoat. Known pet beds have the disadvantage of needing a rimmed section to allow use by e.g., heavy dogs, and the further disadvantage that rimmed sections on walls formed from resilient materials generate high levels of waste. The object of the invention is to avoid this disadvantage, an objective met by a pet bed comprising a peripheral wall formed from a resilient material, the wall having a trapezium cross-sectional shape that diminishes in width from its upper to lower end.

20 Claims, 4 Drawing Sheets

U.S. PATENT DOCUMENTS

| | | | |
|---|---|---|---|
| 5,826,537 A * | 10/1998 | Heilborn | 119/28.5 |
| 5,926,873 A * | 7/1999 | Fountain | 5/424 |
| 6,125,487 A * | 10/2000 | Ive | 5/655 |
| D436,697 S * | 1/2001 | Fiore et al. | D30/118 |
| 6,196,157 B1 * | 3/2001 | Northrop et al. | 119/28.5 |
| 6,237,531 B1 * | 5/2001 | Peeples et al. | 119/28.5 |
| 6,266,832 B1 | 7/2001 | Ezell | |
| 6,347,422 B2 * | 2/2002 | Heavrin | 5/663 |
| D455,872 S | 4/2002 | Sturgis | |
| 6,370,718 B1 * | 4/2002 | Schmid | 5/726 |
| 6,381,787 B1 * | 5/2002 | Rogone et al. | 5/655 |
| 6,393,639 B1 * | 5/2002 | Ohsner | 5/425 |
| 6,408,463 B1 * | 6/2002 | Palacio | 5/424 |
| 6,481,030 B2 * | 11/2002 | Bravo et al. | 5/425 |
| 6,578,217 B1 * | 6/2003 | Roberson | 5/632 |
| 6,851,385 B1 * | 2/2005 | Poss et al. | 119/28.5 |

\* cited by examiner

PET BEDS

RELATED APPLICATION (PRIORITY CLAIM)

This application is a continuation-in-part of U.S. application Ser. No. 10/106,394, filed Mar. 26, 2002 now abandoned, which claims the benefit of British application Serial No. 0107980.5, filed Mar. 30, 2001.

BACKGROUND

This invention relates to pet beds.

It is known to form a pet bed with a base and an upstanding peripheral wall attached to the base, and to cover the wall and base separately or collectively with a fabric overcoat. A material particularly suited to use as the base and wall is a resilient polyether or polyester, but other materials can be used and, for ease of manufacture, the base is ordinarily formed as a circular pad of a required depth, and the wall as a rectangular section of a length to surround the base over its circumference, and optionally to provide a section of lowered height and/or remove a short length of wall to provide an access opening to facilitate entry into the bed by the pet for which the bed is intended.

With larger pets, and particularly larger dogs, it is known to provide increased strength in the peripheral wall by having it formed to an approximate mushroom section, to create a rim of a greater cross-section than that of a dependant and integral wall section. The inherent strength of a pet bed with a rimmed wall construction, allows the head of such as a large dog rest on the rim with a reduced risk of the wall totally collapsing.

The problem attendant to such rimmed wall constructions of resilient material is their cost of production, they needing to be cut or machined from rectangular sectioned blocks, a relatively high cost operation, with the generation of considerable volumes of waste material.

OBJECTS AND SUMMARY

The object of the present invention is to provide a pet bed that avoids those disadvantages mentioned above.

According to the present invention, a pet bed comprises a peripheral wall formed from a resilient material, the wall having a regular cross-sectional shape that diminishes in width from its upper to lower end.

Preferably, a base is provided that may be a pad formed from the same resilient material, or a different material, and the base may be integral with the wall or may be separate or attached to the wall by any suitable means such as an appropriate adhesive, detachable connection means, by welding or by sewing.

The resilient material of the wall can be a polyether, or a polyester of a foamed or sponge-like character, or could be formed from fibrous materials. The base may be of the same material, but could be of any other suitable material.

The wall is desirably formed with a section that is of a generally trapezium shape, that may be a regular trapezium with top and bottom parallel faces and equally and oppositely angled side walls, or it may be an irregular trapezium with top and bottom parallel faces, one side wall perpendicular to the end walls and the opposite side wall at an appropriate angle. With an irregular trapezium, the angled wall can form the inside or the outside wall of the bed.

Both forms of construction allow two or more walls to be cut from a single rectangular block of resilient material, by straight cutting of the side walls, be they angularly disposed or perpendicular. As a direct consequence of this, there are considerable reductions in production costs and a notable reduction in the generation of waste material. With the wall positioned with its narrower lower end adjacent the base, the end of widest section is at the top of the wall; the wall is provided with a strength at least equal to that of specially machined shapes used hitherto Whilst the upper surface of the wall may be plain, it can, if desired, be shaped.

The pet bed may be of round or oval shape, but the nature of the material of the wall would permit other bed shapes to be employed, such as square or rectangular.

For the majority of pets, a side wall as is discussed above, has a sufficient inherent strength to reduce substantially the risk of collapse under a load imposed by the pet. However, for certain usages, it may be advisable to have a reinforcing or strengthening member associated with the wall, such as, for example, a strengthening band extending around the walls outer periphery, in whole or in part.

Preferably, the pet bed, walls and base, are encased in a fabric overcoat. When the base and the wall are separate, they may be separately enclosed and a bottom fabric may be attached to the fabric enclosing the wall. Alternatively, both may have a single fabric overcoat to cover at least the exposed surfaces and possibly, also, the bottom of the base pad. Whilst the fabric overcoat may simply enclose the base and/or wall, it is possible to sew the fabric overcoat to at least the wall, the stitch line being spaced from the upper face of the wall, and generate a rim effect, and may be further stitched, such as at the junction of the wall and the base, to provide an attachment between the wall and the base.

BRIEF DESCRIPTION OF THE DRAWINGS

Several embodiments of the invention will now be described by way of example only, with reference to the accompanying drawings, in which:

FIG. 5 shows a fabric overcoat stitched to the wall to generate a rim, and FIGS. 6 to 10 show constructions prior to stitching the overcoat to the wall, but which could be left unstitched.

DESCRIPTION

Figure 1:
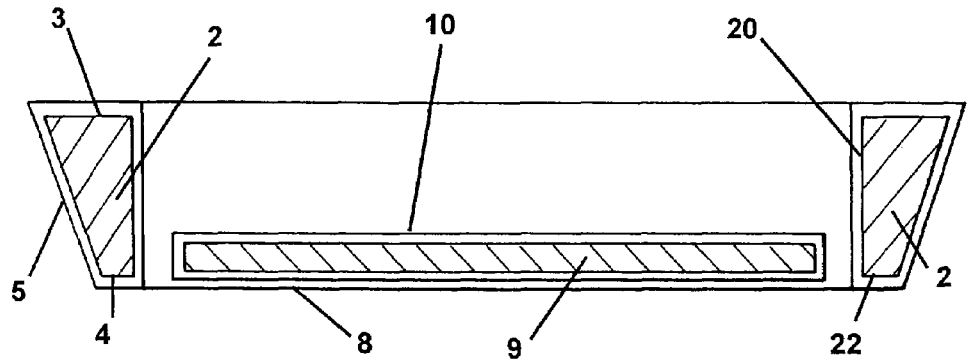
FIG. 1 is a schematic sectional view of a pet bed which is in accordance with an embodiment of the present invention.

In FIG. 1, a pet bed 1 has a circumferential side wall 2 formed from an appropriate form stable resilient material such as, for example, a polyether or a polyester of a foamed or sponge-like character. The side wall has a regular cross-sectional shape, such as a trapezium, that diminishes in width from its upper end 3 towards its lower end 4, and the side wall is encased in a fabric overcoat 5.

The bottom of the bed is closed by a fabric sheet 8 suitably attached to or integral with the fabric overcoat 5, and in the bed bottom there is provided a separate cushion, in the form of a pad 9 of the same material as that of the side wall 2 encased in a fabric outer cover 10 that can be the same as, or can contrast with, the fabric of the overcoat.

Most prior art pet beds have a side wall which is formed of a strip which has a rectangular cross-section. The pet bed 1 shown in FIG. 1 instead has a side wall which has a trapezium cross-section. The trapezium shape provides enhanced strength compared to a side wall which has a conventional rectangular cross-sectional shape (i.e., wherein the height of each side wall is as high as wall 20 in FIG. 1, and wherein the width of both the top and bottom walls are as wide as wall 22 in FIG. 1). The trapezium shape provides the necessary strength for supporting, for example, the head of a large pet, while also providing sufficient top surface area for the pet to be comfortable leaning on the side wall. The trapezium shape provides the strength and comfort surface without having to use too much material and, assuming the side wall is formed as will be described, without creating unnecessary waste.

Figure 2:
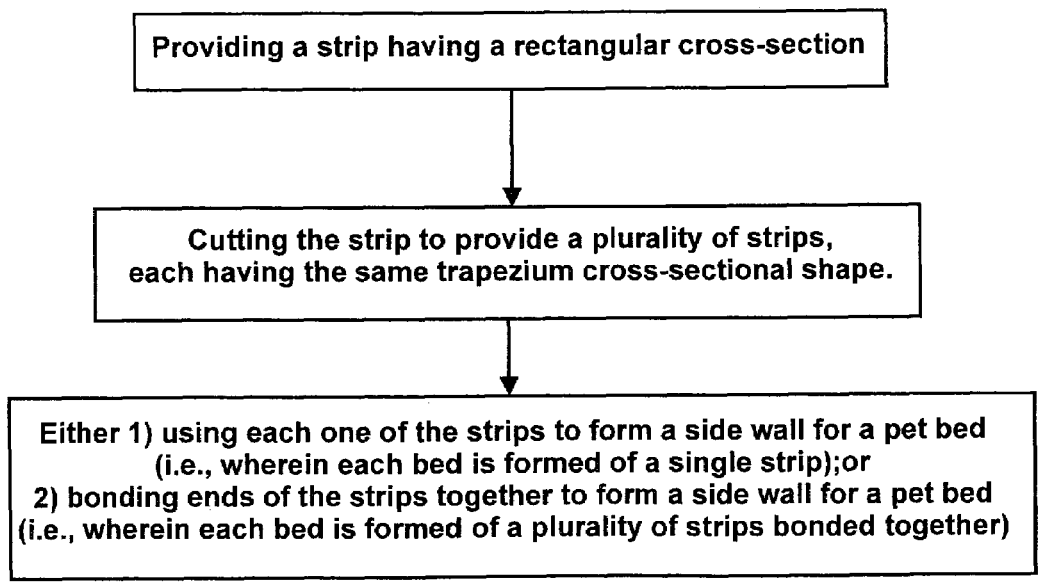
FIG. 2 is a block diagram illustrating a method of making the peripheral wall of the pet bed shown in FIG. 1, wherein the method is in accordance with an embodiment of the present invention.
Figure 3:
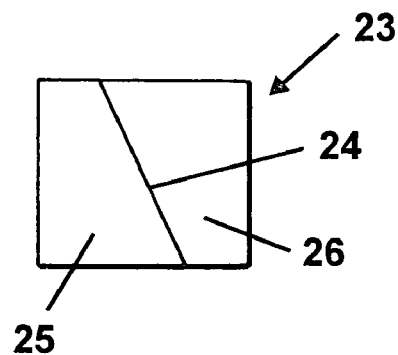
FIG. 3 illustrates a strip having a rectangular cross-section and showing a line where the strip can be cut in accordance with an embodiment of the present invention.

However, the trapezium shape does require extra manufacturing steps over and above providing a conventional rectangular cross-section wall. The trapezium side wall of the pet bed 1 shown in FIG. 1 is preferably formed, as indicated in FIG. 2, by taking a strip or length 23 of resilient material such as, for example, a polyether or a polyester of a foamed or sponge-like character, wherein the strip has a rectangular cross-sectional shape as shown in FIG. 3. Then, the strip is cross-cut with one or more cuts (as indicated by line 24) to form a plurality of identically-shaped strips 25 and 25 having a trapezium cross-section. In other words, the strip 23 starts out having a rectangular cross-section as shown in FIG. 3 and then, via the cut(s), is converted into a plurality of strips (i.e., 25 and 26) having a trapezium cross-section, wherein the cross-sectional shape of each of the strips are identical. As such, a plurality of identical strips are provided from a single rectangular block strip without producing any waste.

Figure 4:
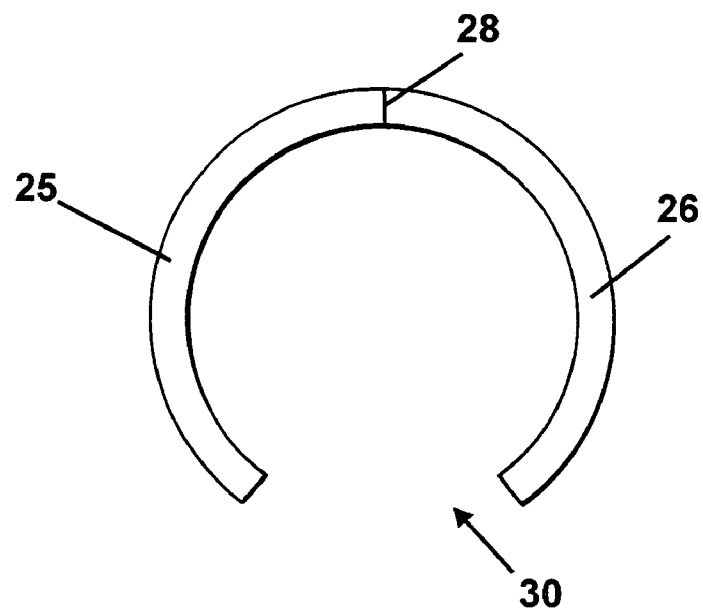
FIG. 4 provides a top view of the pet bed shown in FIG. 1, showing two strips bonded together to form the side wall.

FIG. 4 shows the example where the strip 23 has been cross cut once, to provide two strips 25 and 26, each having an identical trapezium cross-sectional shape (see FIG. 3). Once the strips are cut, the end of one of the strips is aligned with an end of the other strip, and the ends are secured to each other such as by bonding (as represented by line 28). Then, a portion of one or both of the strips is cut to form an entrance 30 for the pet bed (unless the strips are already of the desired length to provide an opening). The side wall 2, i.e., the strips 25 and 26 which have been bonded together, are then encased in the fabric overcoat 5 as shown in FIG. 1.

FIG. 4 provides a top schematic view of the side wall of the pet bed shown in FIG. 1, illustrating the two strips bonded together, and an entrance being provided. As discussed above, each one of the two sections of the side wall of the bed have been cut from the same rectangular block of material, producing no waste. Hence, if the pet bed were to be disassembled, and the two side wall sections disjoined from each other, the two side wall sections can be brought together again to provide what is shown in FIG. 3—a rectangular cross section. In other words, the collective cross-sectional shape of the strips comprises a rectangle, as was originally provided.

Figure 5:
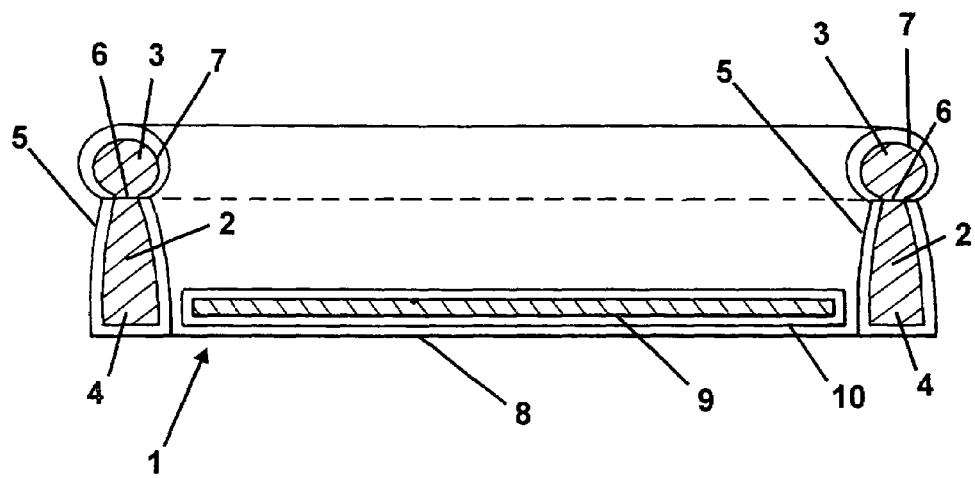
FIGS. 5 to 10 are views similar to FIG. 1, showing different variants; specifically.

FIG. 5 illustrates a variant of FIG. 1, and like reference numerals are used for like components. In FIG. 5, the fabric overcoat 5 is secured to the side wall by stitching as at 6. This not only secures the overcoat in place, but also gives the side wall an aesthetically pleasing appearance, by providing a rim 7 at the top of the side wall. If the stitching is removed, the wall pops back into the shape shown in FIG. 1.

FIGS. 6 to 10 illustrate still more variants of FIG. 1, and like reference numerals are used for like components. All Figures show the side wall shape as manufactured, and the fabric overcoat on the side walls can be left as illustrated or can be stitched to the side wall as is illustrated in FIG. 5.

Figure 6:
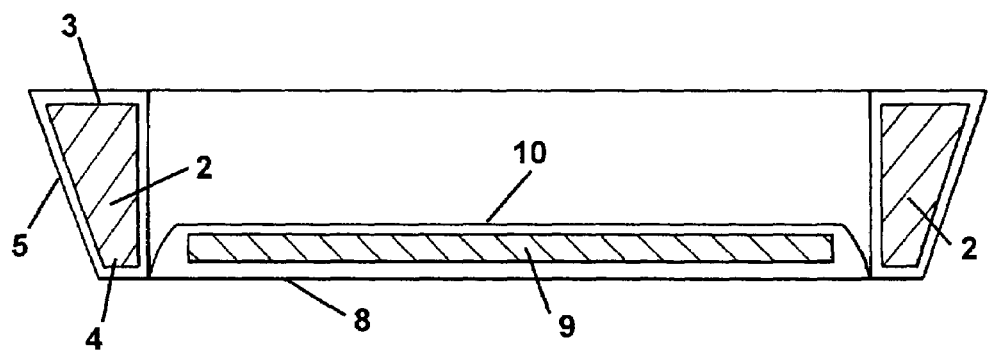

In FIG. 6, in place of a loose pad, a secured pad 9 is provided by having an oversheet 10 of fabric suitably secured to the fabric sheet 8, closing the bottom of the bed.

Figure 7:
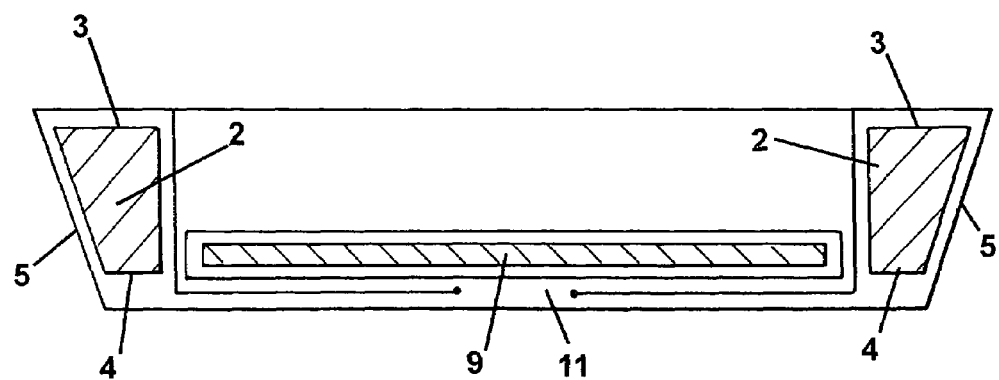

FIG. 7 shows a form of construction with a separate encased pad 9, and a removable overcoat 5 on the side wall 2. Thus the fabric of the overcoat to the outer side of the rim can extend across the bottom of the rim to close it, and the fabric to the inner side of the rim also extends across the bottom of the rim, but has a central aperture 11, to allow the fabric overcoat and base to be pulled from the rim 2.

Figure 8:
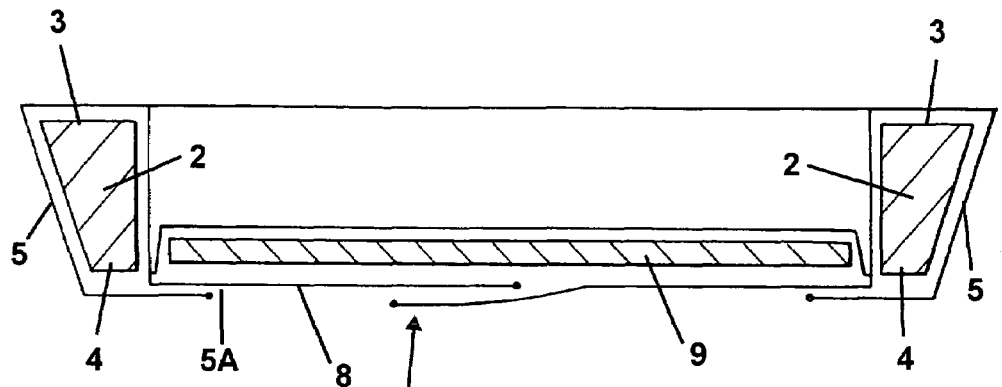

FIG. 8 illustrates a construction with a captive pad 9 and the fabric sheet 8 closing the bottom of the bed slit and overlapped at 12 after the manner of a pillowcase, to allow the removal of the pad 9, the overcoat having a bottom aperture SA to allow its removal from the side wall.

Figure 9:
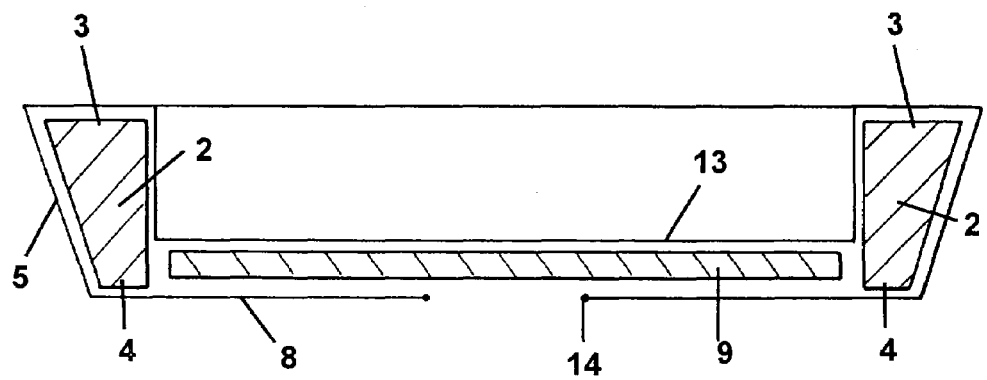
Figure 10:
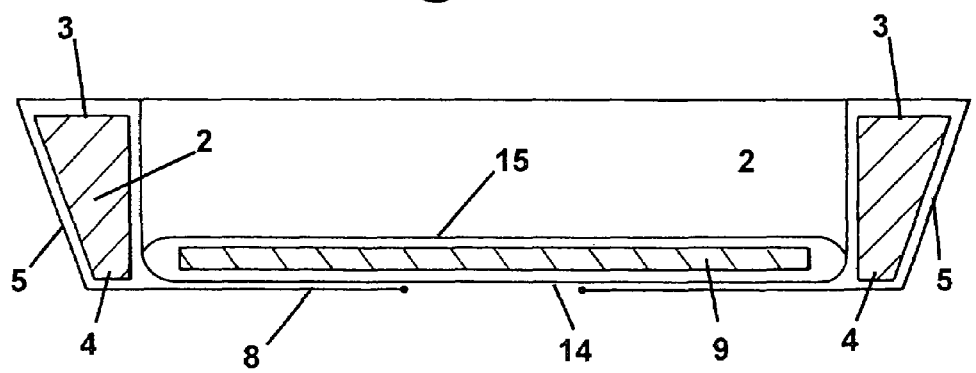

In FIG. 9 the inner face of the fabric overcoat around the rim is extended across the bottom of the bed to form a fabric closure sheet 13, and the outer face of the fabric around the rim is similarly extended across the bottom of the bed to form the bottom sheet 8 which is provided with a central aperture 14. A pad 9 is enclosed between the sheets 8 and 13, the aperture 14 allowing the pad to be removed, and the fabric to be removed from the rim. Although not illustrated, the pad can be laid on top of the closure sheet 13, as a separate loose fabric covered cushion.

FIG. 10 again shows a captive pad arrangement, but here the fabric of the inner face of the overcoat has an envelope 15 attached to it that extends across the bottom of the bed, and encloses the pad 9, and the fabric of the outer face of the overcoat is extended across the base of the bed to form a bottom sheet, with an aperture to allow the fabric and the pad to be removed from the rim.

In the forms of construction illustrated, the side wall is formed of a generally trapezium shape, wider towards its upper end to provide reasonable strength at the upper end of the rime and the cross-sectional shape being such that more than one side wall for a bed can be cut from a single block of the material of the side wall, by straight or angled cuts. This provides a considerable reduction in the generation of waste materials, with consequent reductions in cost, but also simplifies noticeably the manner of the production of the side wall by avoiding relatively complex cutting and machining operations, with again a noticeable reduction in costs.

As shown in FIG. 2, in forming the side wall, once the strip has been cut into a plurality of strips, each one of the strips can be used to form a side wall for a pet bed (i.e., wherein each bed is formed of a single strip). Alternatively, as discussed above with regard to FIGS. 1 and 4, ends of a plurality of strips can be bonded together to form a side wall for a pet bed (i.e., wherein each bed is formed of a plurality of strips bonded together). In either case, the cross-sectional area of each of the strips forms a discrete portion of a rectangle. In other words, if the rectangular block is cut once to form two strips (see FIG. 3), the cross-sectional shape of each strip is 50% of a rectangle. On the other hand, if the rectangular block is cut twice to form three strips, the cross-sectional shape of each strip is 33% of a rectangle, etc.

What is claimed is:

1. A pet bed comprising an open topped structure formed by a base and a peripheral wall upstanding from the base to provide a cavity, the peripheral wall being formed from at least one strip of resilient material, the strip having a trapezium cross-sectional shape that diminishes in width from its upper to its lower end, and the cross-sectional shape of the strip forming a portion of a rectangle.

2. A pet bed as recited in claim 1, wherein the peripheral wall is formed of plurality of strips of resilient material bonded together, wherein the collective cross-sectional shape of the strips comprises a rectangle.

3. A pet bed as in claim 1, wherein the base comprises a pad formed from the same resilient material as the peripheral wall.

4. A pet bed as in claim 1, wherein the base comprises a pad formed of a different material as the peripheral wall.

5. A pet bed as in claim 1, wherein the base is attached to the peripheral wall.

6. A pet bed as in claim 1, wherein the resilient material is a polyester.

7. A pet bed as in claim 1, wherein the resilient material is a polyester of a foamed or sponge-like character.

8. A pet bed as in claim 1, wherein the peripheral wall has top and bottom parallel faces.

9. A pet bed as in claim 8, wherein the wall is an irregular trapezium with top and bottom parallel faces, one side wall perpendicular to the end walls and the opposite side wall at an appropriate angle.

10. A pet bed as in claim 1, wherein a reinforcing or strengthening member is associated with the wall.

11. A pet bed as in claim 10, wherein the reinforcing or strengthening member is a strengthening band extending in part or in whole around the outer periphery of the wall.

12. A pet bed as in claim 1, further comprising an overcoat stitched to the peripheral wall such that the peripheral wall forms a shape other than a trapezium cross-sectional shape, wherein the peripheral wall is configured such that if the stitching is removed, the peripheral wall pops back into its trapezium cross-sectional shape.

13. A pet bed as in claim 1, wherein the peripheral wall is configured to resist collapse under the weight of a pet within the cavity.

14. A method of making a peripheral wall of a pet bed which is formed from at least one strip of resilient material, wherein the strip has a trapezium cross-sectional shape that diminishes in width from its upper to lower end, wherein the cross-sectional shape of the strip forms a portion of a rectangle, said method comprising: providing a strip of said resilient material having a rectangular cross-section; cutting the strip to provide a plurality of strips, each having the same trapezium cross-sectional shape; and either:

using each one of the strips to form a side wall for a pet bed, wherein each bed is formed of a single strip; or bonding ends of the strips together to form a side wall for a pet bed, wherein each bed is formed of a plurality of strips bonded together; and further forming the pet bed such that the pet bed comprises an open topped structure formed by a base and the peripheral wall, wherein the peripheral wall upstands from the base to provide a cavity.

15. A pet bed comprising a peripheral wall formed from at least one strip of resilient material, wherein the strip has a trapezium cross-sectional shape that diminishes in width from its upper to lower end, wherein the cross-sectional shape of the strip forms a portion of a rectangle, further comprising an overcoat stitched to the peripheral wall such that the peripheral wall forms a shape other than a trapezium cross-sectional shape, wherein the peripheral wall is configured such that if the stitching is removed, the peripheral wall pops back into its trapezium cross-sectional shape.

16. A pet bed as recited in claim 15, wherein the peripheral wall is formed of plurality of strips of resilient material bonded together, wherein the collective cross-sectional shape of the strips comprises a rectangle.

17. A pet bed as in claim 15, wherein the base comprises a pad formed from the same resilient material as the peripheral wall.

18. A pet bed as in claim 15, wherein the base comprises a pad formed of a different material as the peripheral wall.

19. A pet bed as in claim 15, wherein the base is attached to the peripheral wall.

20. A pet bed as in claim 15, wherein the resilient material is a polyester.

* * * * *